United States Patent
Cherry et al.

(10) Patent No.: US 10,363,977 B2
(45) Date of Patent: Jul. 30, 2019

(54) HEIGHT-ADJUSTABLE SPARE TIRE CARRIERS HAVING CHEBYSHEV LINKAGES

(71) Applicant: Ford Global Technologies, LLC, Dearborn, MI (US)

(72) Inventors: William Reese Cherry, Madison Heights, MI (US); Peter Lazarevski, Dearborn, MI (US); Matt Rutman, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 39 days.

(21) Appl. No.: 15/721,386

(22) Filed: Sep. 29, 2017

(65) Prior Publication Data
US 2019/0100257 A1    Apr. 4, 2019

(51) Int. Cl.
B62D 43/00    (2006.01)
B60R 9/06     (2006.01)
B62D 43/02    (2006.01)

(52) U.S. Cl.
CPC ........... *B62D 43/002* (2013.01); *B62D 43/02* (2013.01); *B60R 9/06* (2013.01)

(58) Field of Classification Search
CPC .......... B62D 43/00; B62D 43/02; B60R 9/00; B60R 9/06
See application file for complete search history.

(56) References Cited

U.S. PATENT DOCUMENTS

| | | | | |
|---|---|---|---|---|
| 1,751,480 A | * | 3/1930 | Howell | B66F 5/025 254/10 R |
| 3,613,971 A | * | 10/1971 | Betz | B60R 3/02 224/402 |
| 3,699,716 A | * | 10/1972 | Wanlass | B60J 5/12 49/374 |
| 3,822,814 A | * | 7/1974 | Baldi | B62D 43/02 224/402 |
| 3,862,696 A | * | 1/1975 | McCauley | B62D 43/04 224/42.21 |
| 3,881,749 A | * | 5/1975 | Berends | B62D 53/065 280/417.1 |
| 3,904,093 A | * | 9/1975 | Hanela | B62D 43/04 224/42.21 |

(Continued)

FOREIGN PATENT DOCUMENTS

| | | |
|---|---|---|
| CN | 2902846 | 5/2007 |
| CN | 201895717 | 7/2011 |

(Continued)

OTHER PUBLICATIONS

ArmyProperty.com, "Drop-Down Spare Tire Carrier—Mechanical Assist," retrieved from [http://www.armyproperty.com/Equipment-Info/Acessories/MASTC.htm] on Sep. 28, 2017, 2 pages.

*Primary Examiner* — Brian D Nash
(74) *Attorney, Agent, or Firm* — Vichit Chea; Hanley, Flight & Zimmerman, LLC

(57) ABSTRACT

Height-adjustable spare tire carriers having Chebyshev linkages are described. An example spare tire carrier is to be coupled to a vehicle. The spare tire carrier includes a Chebyshev linkage having an output shaft to carry a spare tire of the vehicle. The output shaft is movable between a raised position and a lowered position.

19 Claims, 7 Drawing Sheets

(56) References Cited

U.S. PATENT DOCUMENTS

| | | | | |
|---|---|---|---|---|
| 4,072,258 A * | 2/1978 | Cruson | B62D 43/002 | 224/42.21 |
| 4,155,472 A * | 5/1979 | Dansbury | B62D 43/045 | 224/42.21 |
| 4,278,191 A * | 7/1981 | Mecham | B62D 43/002 | 224/42.21 |
| 4,400,985 A * | 8/1983 | Bond | B65G 47/904 | 414/744.5 |
| 4,573,855 A * | 3/1986 | Braswell | B62D 43/04 | 224/42.23 |
| 4,711,382 A * | 12/1987 | Helterbrand | B62D 43/04 | 224/42.12 |
| 4,717,054 A | 1/1988 | Vanzant | | |
| 4,747,353 A * | 5/1988 | Watt | A47B 9/02 | 108/145 |
| 4,976,384 A | 12/1990 | Daniels | | |
| 5,186,371 A * | 2/1993 | Jozefczak | B62D 43/002 | 224/42.21 |
| 5,368,280 A * | 11/1994 | Ng | B62D 43/045 | 254/323 |
| 5,469,998 A * | 11/1995 | Van Dusen | B60D 1/52 | 224/42.21 |
| 5,671,850 A * | 9/1997 | Basala | A47F 5/0087 | 211/104 |
| 5,993,133 A * | 11/1999 | Murray | B62D 43/045 | 224/42.12 |
| 6,092,790 A * | 7/2000 | Dobmeier | B66D 1/04 | 224/42.23 |
| 6,659,318 B2 | 12/2003 | Newbill | | |
| 6,796,466 B2 * | 9/2004 | Essig | B62D 43/02 | 224/42.21 |
| 7,086,664 B2 * | 8/2006 | Voegeli, Jr. | B66F 13/00 | 16/422 |
| 7,591,627 B2 * | 9/2009 | Westover | B62B 1/10 | 414/476 |
| 8,540,125 B2 | 9/2013 | Newbill | | |
| 9,266,704 B1 * | 2/2016 | Hall | B66F 3/22 | |
| 9,784,347 B2 * | 10/2017 | Martyn | F16H 21/04 | |
| 9,828,222 B2 * | 11/2017 | Nedelman | B65G 67/24 | |
| 10,035,471 B2 * | 7/2018 | Ziv | B60R 9/10 | |
| 2004/0222261 A1 | 11/2004 | Wilson | | |
| 2009/0047108 A1 * | 2/2009 | Barie | B60S 9/12 | 414/427 |

FOREIGN PATENT DOCUMENTS

| | | |
|---|---|---|
| DE | 10311574 | 9/2004 |
| EP | 0426628 | 5/1991 |
| EP | 1650115 | 4/2006 |
| GB | 539624 | 9/1941 |

\* cited by examiner

HEIGHT-ADJUSTABLE SPARE TIRE CARRIERS HAVING CHEBYSHEV LINKAGES

FIELD OF THE DISCLOSURE

This disclosure relates generally to height-adjustable spare tire carriers and, more specifically, to height-adjustable spare tire carriers having Chebyshev linkages.

BACKGROUND

Vehicles such as sport-utility vehicles, light-duty trucks and heavy-duty trucks commonly include a spare tire carrier coupled and/or mounted to a rear end (e.g., a rear bumper, a tail light section, a tailgate, etc.) of the vehicle. The spare tire carrier carries a full-size spare tire that is removably coupled to and/or mounted on the spare tire carrier. The full-size spare tire may be removed from the spare tire carrier, for example, in connection with replacing a flat and/or otherwise damaged tire that may be mounted to an axle of the vehicle. The full-size spare tire may have a weight exceeding one hundred pounds, and the wheel center of the full-size spare tire may be at a fixed height of more than two feet above the ground when the full-size spare tire is coupled to the spare tire carrier.

SUMMARY

Height-adjustable spare tire carriers having Chebyshev linkages are disclosed herein. In some examples, an apparatus is disclosed. In some disclosed examples, the apparatus comprises a spare tire carrier to be coupled to a vehicle. In some disclosed examples, the spare tire carrier includes a Chebyshev linkage having an output shaft to carry a spare tire of the vehicle. In some disclosed examples, the output shaft is movable between a raised position and a lowered position.

In some disclosed examples, an apparatus comprises a spare tire carrier to be coupled to a vehicle. In some disclosed examples, the spare tire carrier includes a Chebyshev linkage having a shaft to carry a spare tire of the vehicle. In some disclosed examples, the output shaft is movable along a vertical axis between a raised position having a first height and a lowered position having a second height less than the first height.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Known spare tire carriers carry a full-size spare tire that is removably coupled to and/or mounted on the spare tire carrier. The full-size spare tire may have a weight exceeding one hundred pounds, and the wheel center of the full-size spare tire may be at a fixed height of more than two feet above the ground when the full-size spare tire is coupled to the spare tire carrier. Thus, a substantial amount of work may be required (e.g., by a person) in connection with removing and/or attaching the full-size spare tire from and/or to the spare tire carrier, including lowering the full-size spare tire from the spare tire carrier to an underlying ground surface, and/or raising the full-size spare tire from the underlying ground surface to the spare tire carrier.

The height-adjustable spare tire carriers disclosed herein include a Chebyshev linkage that advantageously enables a spare tire (e.g., a full-size spare tire) carried by an output shaft of the Chebyshev linkage to be mechanically lowered from a first position (e.g., a raised position) separated from an underlying ground surface by a first distance to a second position (e.g., a lowered position) separated from the underlying ground surface by a second distance that is less than the first distance. Mechanically lowering the spare tire from the first position to the second position via the Chebyshev linkage advantageously reduces the amount of work to be performed by a person in connection with removing and/or attaching the spare tire from and/or to the spare tire carrier, including lowering the spare tire from the spare tire carrier to an underlying ground surface, and/or raising the spare tire from the underlying ground surface to the spare tire carrier.

Figure 1:
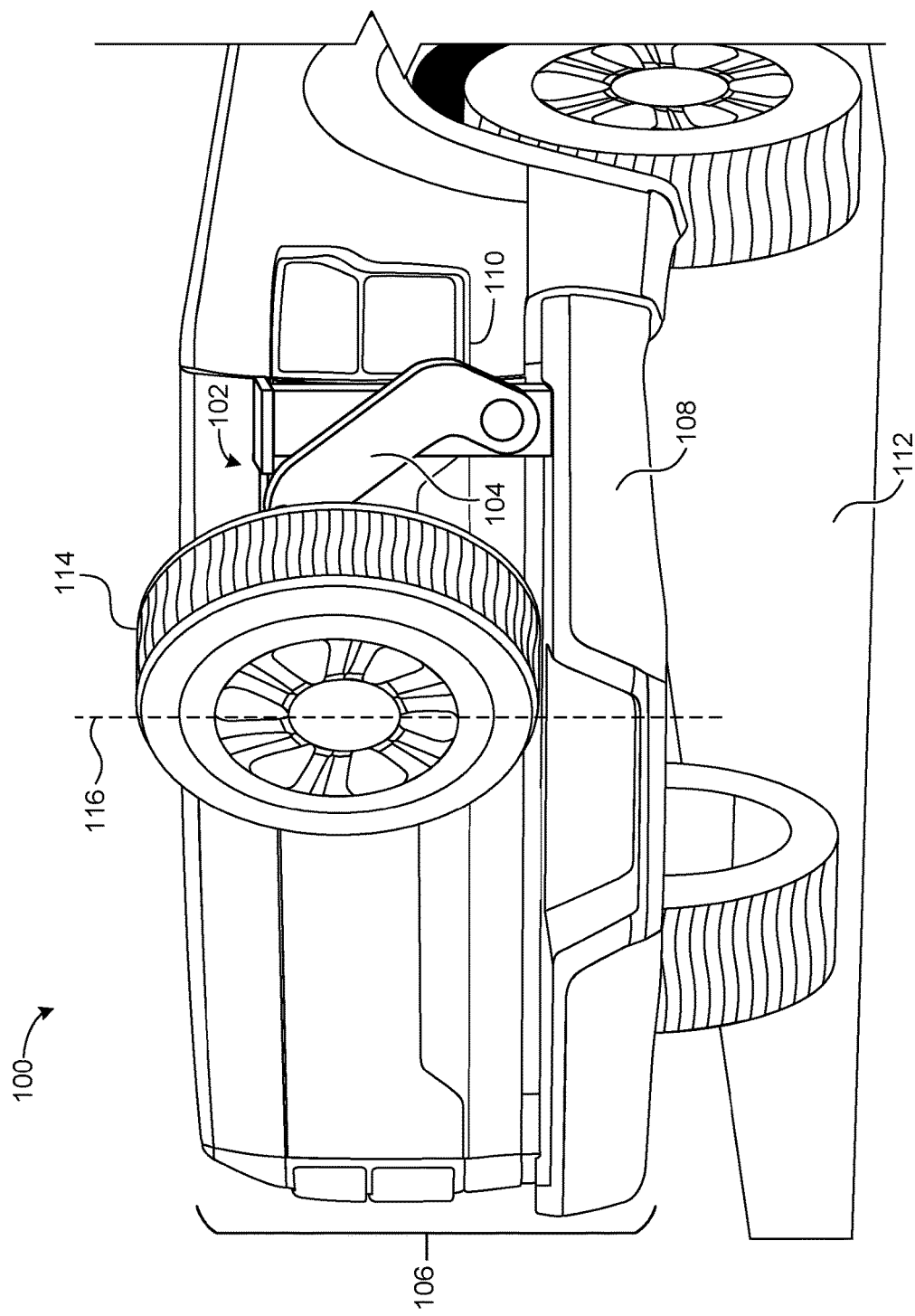
FIG. 1 illustrates an example vehicle including an example height-adjustable spare tire carrier having an example Chebyshev linkage constructed in accordance with the teachings of this disclosure.

FIG. 1 illustrates an example vehicle 100 including an example height-adjustable spare tire carrier 102 having an example Chebyshev linkage 104 constructed in accordance with the teachings of this disclosure. The vehicle 100 of FIG. 1 may be a sport-utility vehicle, a light-duty truck, a heavy-duty truck, etc. In the illustrated example of FIG. 1, the height-adjustable spare tire carrier 102 is coupled and/or mounted to an example rear end structure 106 of the vehicle 100. For example, the height-adjustable spare tire carrier 102 may be coupled and/or mounted to an example rear bumper 108 and/or an example tail light section 110 of the vehicle 100. In some examples, the height-adjustable spare tire carrier 102 of FIG. 1 may be pivotable and/or rotatable relative to the rear end structure 106 of the vehicle 100 such that the height-adjustable spare tire carrier 102 may be pivoted and/or rotated away from the rear end structure 106 of the vehicle 100 to enable a tailgate of the vehicle 100 proximate the tail light section 110 to be opened without interference from the height-adjustable spare tire carrier 102.

In the illustrated example of FIG. 1, the vehicle 100 is positioned on an example underlying ground surface 112. The vehicle 100 of FIG. 1 includes an example spare tire 114 (e.g., a full size spare tire) that is removably coupled and/or mounted (e.g., via threaded bolts and nuts) to the height-adjustable spare tire carrier 102 of FIG. 1. Actuation (e.g., via a force applied by a person) of the Chebyshev linkage 104 of the height-adjustable spare tire carrier 102 of FIG. 1 causes the spare tire 114 of FIG. 1 to move from a first position (e.g., the raised position shown in FIG. 1) separated from the underlying ground surface 112 by a first distance to a second position (e.g., a lowered position) separated from the underlying ground surface 112 by a second distance that is less than the first distance. For example, the Chebyshev linkage 104 of the height-adjustable spare tire carrier 102 of FIG. 1 may be actuated to lower the spare tire 114 of FIG. 1 from the first position to the second position to reduce an amount of work that may be required by a person to remove the spare tire 114 from the vehicle (e.g., as may occur when changing a flat tire of the vehicle 100). In some examples, movement of the spare tire 114 of FIG. 1 between the first position and the second position in response to actuating the Chebyshev linkage 104 of the height-adjustable spare tire carrier 102 of FIG. 1 occurs along an example vertical axis 116 of FIG. 1.

Figure 2:
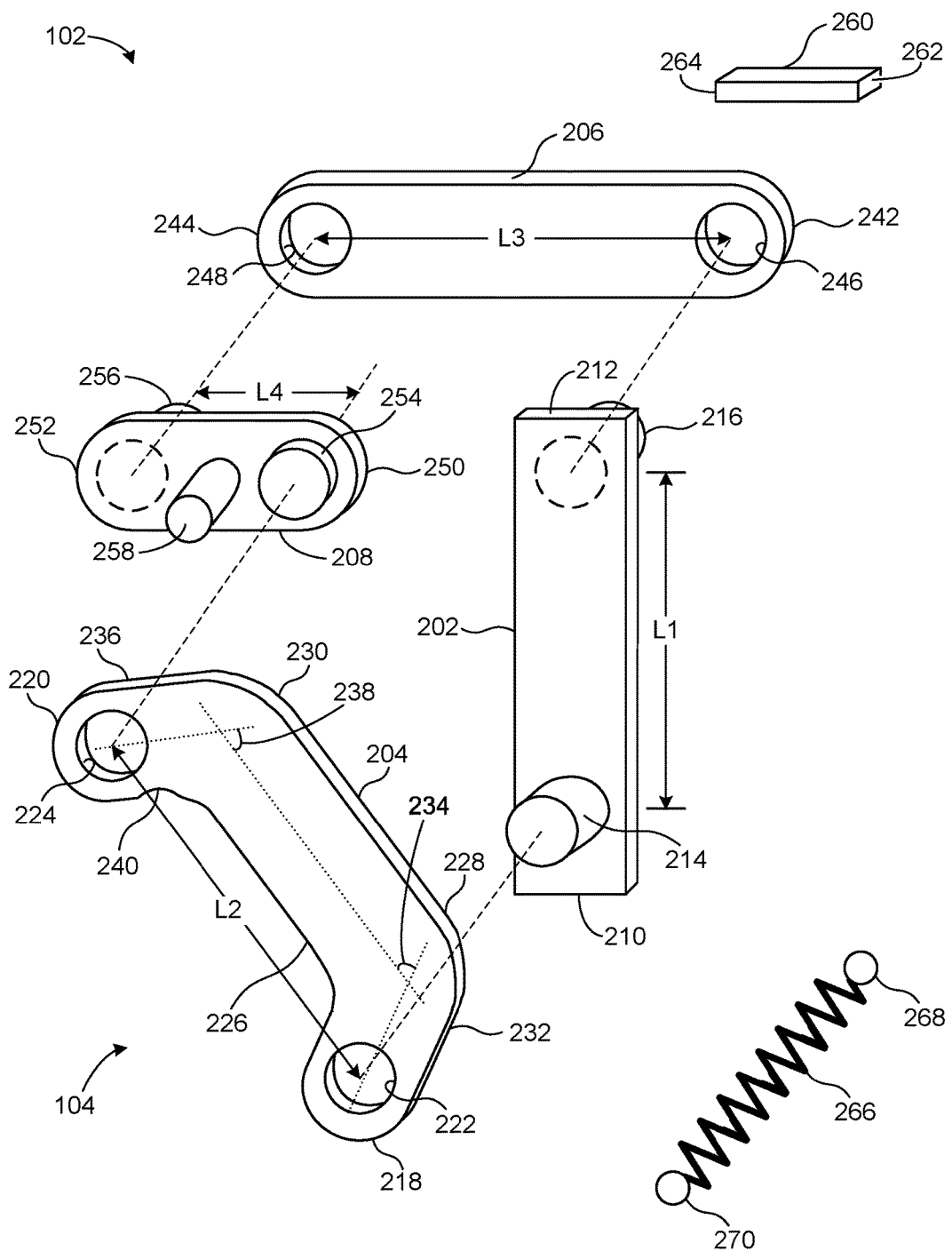
FIG. 2 is an exploded view of the example height-adjustable spare tire carrier of FIG. 1.

FIG. 2 is an exploded view of the example height-adjustable spare tire carrier 102 of FIG. 1. In the illustrated example of FIG. 2, the Chebyshev linkage 104 of the height-adjustable spare tire carrier 102 includes an example post 202, an example first link 204, an example second link 206, and an example third link 208. Any of the post 202, the first link 204, the second link 206, and/or the third link 208 may be implemented as one or more link(s), strut(s), bar(s), rod(s), shaft(s), plate(s), etc. of any shape(s) and/or any size(s), including the shape(s) and/or size(s) described below.

The post 202 of FIG. 2 includes an example first end 210 and an example second end 212 located opposite the first end 210 of the post 202. The post 202 of FIG. 2 further includes an example first shaft 214 located proximate the first end 210 of the post 202, and an example second shaft 216 located proximate the second end 212 of the post 202. In the illustrated example of FIG. 2, the first shaft 214 of the post 202 extends transversely from the post 202 in a first direction, and the second shaft 216 of the post 202 extends transversely from the post 202 in a second direction opposite the first direction.

The post 202 of FIG. 2 has a linear shape that defines an associated length (L1) of the post 202. The associated length (L1) of the post 202 may be measured as the distance between the center of the first shaft 214 of the post 202 and the center of the second shaft 216 of the post 202. In some examples, the associated length (L1) of the post 202 of FIG. 2 may have a value ranging between approximately 18.0 and 24.0 inches. In the illustrated example of FIG. 2, the associated length (L1) of the post 202 of FIG. 2 may be approximately 20.0 inches.

The first link 204 of FIG. 2 includes an example first end 218 and an example second end 220 located opposite the first end 218 of the first link 204. The first link 204 of FIG. 2 further includes an example first through hole 222 formed proximate the first end 218 of the first link 204, and an example second through hole 224 formed proximate the second end 220 of the first link 204.

The first link 204 of FIG. 2 has a bent shape that includes an example linear section 226 having an example first end 228 and an example second end 230 located opposite the first end 228 of the linear section 226, an example first angled section 232 extending at an example first angle 234 from the first end 228 of the linear section 226, and an example second angled section 236 extending at an example second angle 238 from the second end 230 of the linear section 226. In other examples, the first link 204 may have a bent shape that includes a linear section and a single angled and/or curved section. The first link 204 may be of any shape and/or size that enables the first link 204 and the third link 208 to rotate relative to one another without the first link 204 interfering with an output shaft of the third link 208 as the height-adjustable spare tire carrier 102 moves from a raised position to a lowered position.

In the illustrated example of FIG. 2, an example detent 240 is formed in the first link 204 proximate the juncture of the linear section 226 and the second angled section 236 of the first link 204. As further described below in connection with FIGS. 3-6, the detent 240 of FIG. 2 is to receive a shaft of the third link 208 (e.g., the third shaft 258 of the third link 208 described below) when the shaft of the third link 208 is in a lowered position The first link 204 of FIG. 2 has an associated length (L2) defined by the span and/or distance between the first end 218 of the first link 204 and the second end 220 of the first link 204. The associated length (L2) of the first link 204 may be measured as the distance between the center of the first through hole 222 of the first link 204 and the center of the second through hole 224 of the first link 204. In some examples, the associated length (L2) of the first link 204 of FIG. 2 is approximately five-fourths (e.g., one and one-fourth) the associated length (L1) of the post 202 of FIG. 2. In some examples, the associated length (L2) of the first link 204 of FIG. 2 may have a value ranging between approximately 22.5 and 30.0 inches. In the illustrated example of FIG. 2, the associated length (L2) of the first link 204 of FIG. 2 may be approximately 25.0 inches.

The second link 206 of FIG. 2 includes an example first end 242 and an example second end 244 located opposite the first end 242 of the second link 206. The second link 206 of FIG. 2 further includes an example first through hole 246 formed proximate the first end 242 of the second link 206, and an example second through hole 248 formed proximate the second end 244 of the second link 206.

The second link 206 of FIG. 2 has a linear shape that defines an associated length (L3) of the second link 206. The associated length (L3) of the second link 206 may be measured as the distance between the center of the first through hole 246 of the second link 206 and the center of the second through hole 248 of the second link 206. In some examples, the associated length (L3) of the second link 206 of FIG. 2 is approximately equal to the associated length (L2) of the first link 204 of FIG. 2. In some examples, the associated length (L3) of the second link 206 of FIG. 2 may have a value ranging between approximately 22.5 and 30.0 inches. In the illustrated example of FIG. 2, the associated length (L3) of the second link 206 of FIG. 2 may be approximately 25.0 inches.

The third link 208 of FIG. 2 includes an example first end 250 and an example second end 252 located opposite the first end 250 of the third link 208. The third link 208 of FIG. 2 further includes an example first shaft 254 located proximate the first end 250 of the third link 208, an example second shaft 256 located proximate the second end 252 of the third link 208, and an example third shaft 258 located approximately midway between the first end 250 of the third link 208 and the second end 252 of the third link 208. In the illustrated example of FIG. 2, the first shaft 254 of the third link 208 extends transversely from the third link 208 in a first direction, the second shaft 256 of the third link 208 extends transversely from the third link 208 in a second direction opposite the first direction, and the third shaft 258 of the third link 208 extends transversely from the third link 208 in the first direction.

The third link 208 of FIG. 2 has a linear shape that defines an associated length (L4) of the third link 208. The associated length (L4) of the third link 208 may be measured as the distance between the center of the first shaft 254 of the third link 208 and the center of the second shaft 256 of the third link 208. In some examples, the associated length (L4) of the third link 208 of FIG. 2 is approximately one-half the associated length (L1) of the post 202 of FIG. 2, and approximately two-fifths the associated length (L2) of the first link 204 of FIG. 2. In some examples, the associated length (L4) of the third link 208 of FIG. 2 may have a value ranging between approximately 9.0 and 12.0 inches. In the illustrated example of FIG. 2, the associated length (L4) of the third link 208 of FIG. 2 may be approximately 10.0 inches.

The third link 208 may be of any shape and/or size that enables the first link 204 and the third link 208 to rotate relative to one another without the first link 204 interfering with the third shaft 258 of the third link 208 as the height-adjustable spare tire carrier 102 moves from a raised position to a lowered position. For example, the third link 208 may be formed as a triangular-shaped plate-like structure wherein the first shaft 254, the second shaft 256, and the third shaft 258 of the third link 208 are respectively positioned proximate corresponding ones of the three vertices and/or corners of the triangle. In such an example, the vertical range of motion of the third shaft 258 of the third link 208 as the height-adjustable spare tire carrier 102 moves from a raised position to a lowered position may be increased relative to the range of motion that may be achieved via the example implementation of the third link 208 shown in FIGS. 2-6.

In the illustrated example of FIG. 2, the third shaft 258 of the third link 208 functions and/or serves as an output shaft for the Chebyshev linkage 104 and/or the height-adjustable spare tire carrier 102 of FIGS. 1 and 2. In some examples, the spare tire 114 of FIG. 1 may be removably coupled and/or mounted (e.g., directly or indirectly) to the third shaft 258 of the third link 208 of the Chebyshev linkage 104. When the spare tire 114 is coupled and/or mounted to the third shaft 258 of the third link 208, the height and/or position of the spare tire 114 along the vertical axis 116 of FIG. 1 is based on the height and/or position of the third shaft 258 of the third link 208 of the Chebyshev linkage 104.

In the illustrated example of FIG. 2, the height-adjustable spare tire carrier 102 further includes an example lock 260. The lock 260 of FIG. 2 includes an example first end 262 and an example second end 264 located opposite the first end 262 of the lock 260. In some examples, the lock 260 of FIG. 2 may be implemented as a flange or a plate. The first end 262 of the lock 260 may be coupled to and/or integrally formed with the second end 212 of the post 202 of FIG. 2 such that the second end 264 of the lock 260 extends transversely from the post 202 in a direction that enables the second link 206 of FIG. 2 to engage the lock 260. As further described below in connection with FIGS. 3-6, the lock 260 of FIG. 2 limits the range of motion of the second link 206 and/or, more generally, of the Chebyshev linkage 104, and accordingly limits the range of motion of the spare tire 114 along the vertical axis 116.

In the illustrated example of FIG. 2, the height-adjustable spare tire carrier 102 further includes an example spring 266. The spring 266 of FIG. 2 includes an example first end 268 and an example second end 270 located opposite the first end 268 of the spring 266. The first end 268 of the spring 266 may be coupled to the second shaft 216 and/or the second end 212 of the post 202 of FIG. 2. The second end 270 of the spring 266 may be coupled to the third shaft 258 of the third link 208 of FIG. 2. As further described below in connection with FIGS. 3-6, the spring 266 of FIG. 2 biases the third shaft 258 of the third link 208 and/or, more generally, the Chebyshev linkage 104 of the height-adjustable spare tire carrier 102 into a position that corresponds to the first position (e.g., the raised position shown in FIG. 1) of the spare tire 114 as described above.

When the Chebyshev linkage 104 of the height-adjustable spare tire carrier 102 of FIGS. 1 and 2 is assembled (e.g., as shown in FIGS. 3-6 described below), the first end 218 of the first link 204 of FIG. 2 is rotatably coupled to the first end 210 of the post 202 of FIG. 2, the second end 220 of the first link 204 of FIG. 2 is rotatably coupled to the first end 250 of the third link 208 of FIG. 2, the first end 242 of the second link 206 of FIG. 2 is rotatably coupled to the second end 212 of the post 202 of FIG. 2, and the second end 244 of the second link 206 of FIG. 2 is rotatably coupled to the second end 252 of the third link 208 of FIG. 2.

For example, the first end 218 of the first link 204 of FIG. 2 may be rotatably coupled to the first end 210 of the post 202 of FIG. 2 by positioning the first shaft 214 of the post 202 of FIG. 2 within the first through hole 222 of the first link 204 of FIG. 2. The second end 220 of the first link 204 of FIG. 2 may be rotatably coupled to the first end 250 of the third link 208 of FIG. 2 by positioning the first shaft 254 of the third link 208 of FIG. 2 within the second through hole 224 of the first link 204 of FIG. 2. The first end 242 of the second link 206 of FIG. 2 may be rotatably coupled to the second end 212 of the post 202 of FIG. 2 by positioning the second shaft 216 of the post 202 of FIG. 2 within the first through hole 246 of the second link 206 of FIG. 2. The second end 244 of the second link 206 of FIG. 2 may be rotatably coupled to the second end 252 of the third link 208 of FIG. 2 by positioning the second shaft 256 of the third link 208 of FIG. 2 within the second through hole 248 of the second link 206 of FIG. 2.

In other examples, the above-described rotatable couplings between the post 202, the first link 204, the second link 206, and the third link 208 of the Chebyshev linkage 104 of the height-adjustable spare tire carrier 102 of FIGS. 1 and 2 may alternatively be implemented by any type(s) of fastener(s) (e.g., screw(s), bolt(s), pin(s), rivet(s), etc.) that enable the first link 204 and/or the second link 206 of FIG. 2 to be rotatably coupled to the post 202 of FIG. 2, and/or that enable the third link 208 of FIG. 2 to be rotatably coupled to the first link 204 and/or the second link 206 of FIG. 2.

In some examples, assembly of the Chebyshev linkage 104 and/or the height-adjustable spare tire carrier 102 of FIG. 2 may further include coupling and/or mounting the first end 262 of the lock 260 of FIG. 2 to the second end 212 of the post 202 of FIG. 2. In some examples, assembly of the Chebyshev linkage 104 and/or the height-adjustable spare tire carrier 102 of FIG. 2 may further include coupling and/or mounting the first end 268 of the spring 266 of FIG. 2 to the second shaft 216 and/or the second end 212 of the post 202 of FIG. 2, and coupling and/or mounting the second end 270 of the spring 266 of FIG. 2 to the third shaft 258 of the third link 208 of FIG. 2.

In some examples, assembly of the Chebyshev linkage 104 and/or the height-adjustable spare tire carrier 102 of FIG. 2 may further include coupling and/or mounting the Chebyshev linkage 104 and/or the height-adjustable spare tire carrier 102 to the rear end structure 106 of the vehicle 100 of FIG. 1. For example, the first end 210 of the post 202 may be coupled and/or mounted to the rear bumper 108 of the vehicle 100 of FIG. 1. In some examples, the post 202 of FIG. 2 may be pivotable and/or rotatable relative to the rear end structure 106 of the vehicle 100 such that the height-adjustable spare tire carrier 102 may be pivoted and/or rotated away from the rear end structure 106 of the vehicle 100 to enable a tailgate of the vehicle 100 proximate the tail light section 110 to be opened without interference from the height-adjustable spare tire carrier 102.

Figure 3:
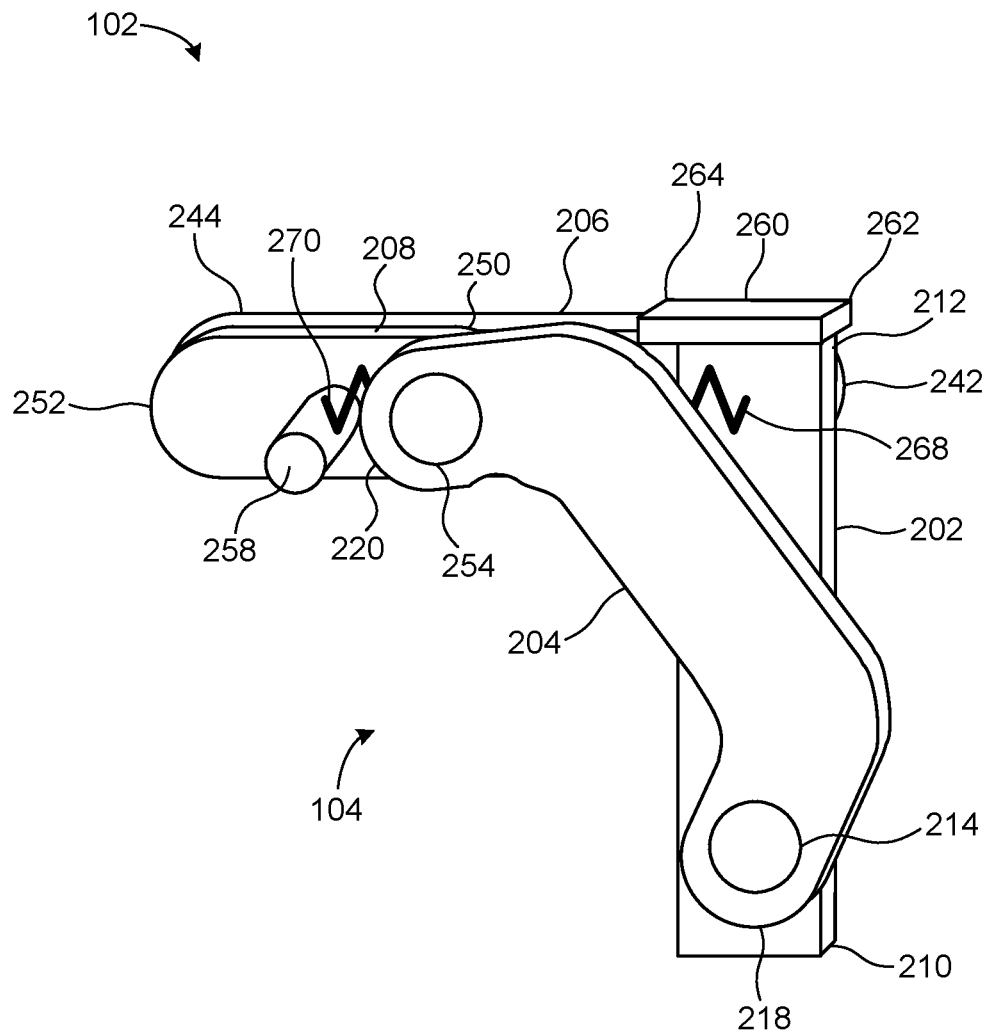
FIG. 3 is a perspective view of the example height-adjustable spare tire carrier of FIGS. 1 and 2 in a raised position.
Figure 4:
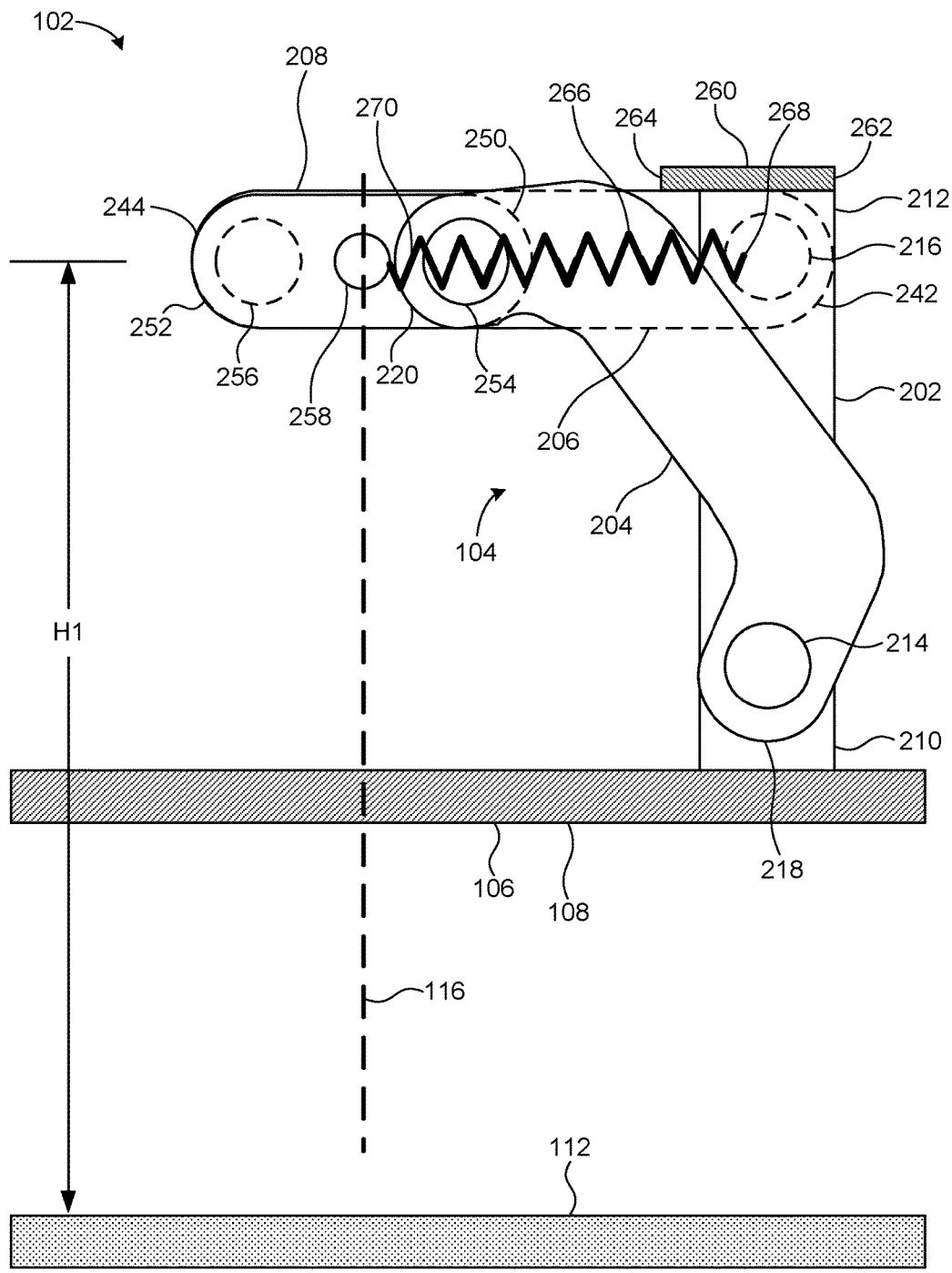
FIG. 4 is a front view of the example height-adjustable spare tire carrier of FIGS. 1-3 in the raised position of FIG. 3.
Figure 5:
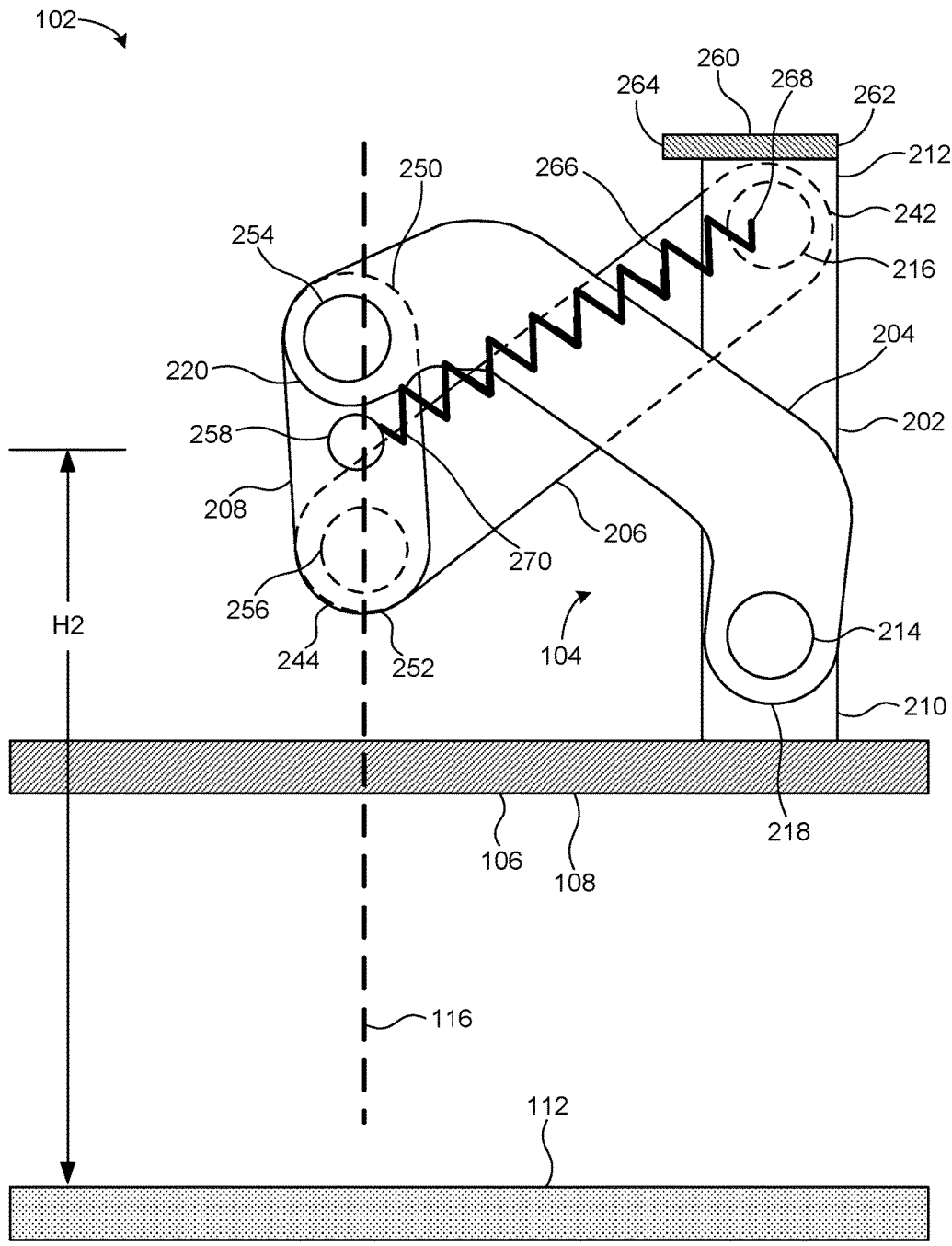
FIG. 5 is a front view of the example height-adjustable spare tire carrier of FIGS. 1-4 in an intermediate position.
Figure 6:
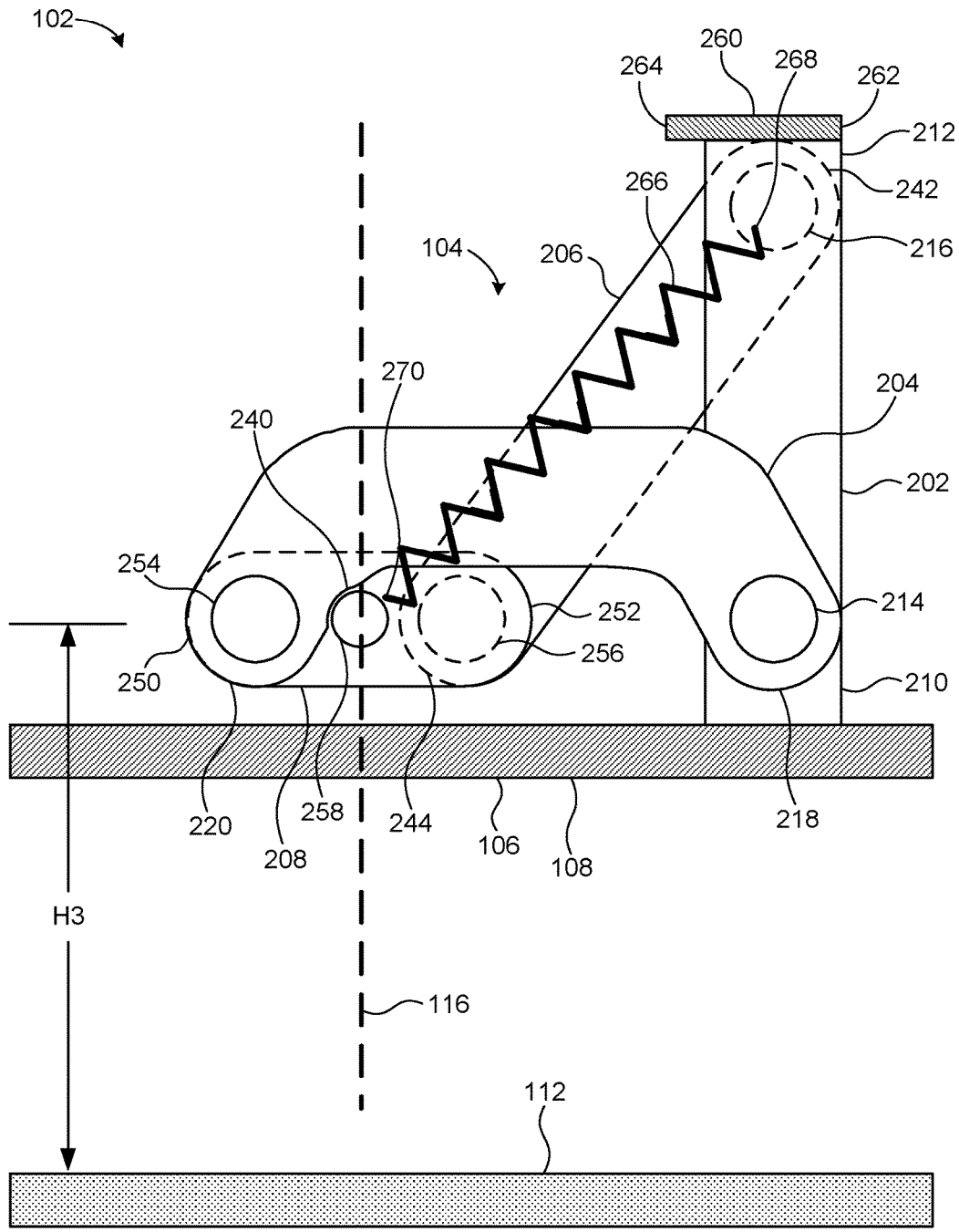
FIG. 6 is a front view of the example height-adjustable spare tire carrier of FIGS. 1-5 in a lowered position.

FIG. 3 is a perspective view of the example height-adjustable spare tire carrier 102 of FIGS. 1 and 2 in a raised position. FIG. 4 is a front view of the example height-adjustable spare tire carrier 102 of FIGS. 1-3 in the raised position of FIG. 3. FIG. 5 is a front view of the example height-adjustable spare tire carrier 102 of FIGS. 1-4 in an intermediate position. FIG. 6 is a front view of the example height-adjustable spare tire carrier 102 of FIGS. 1-5 in a lowered position. In the illustrated examples of FIGS. 3-6, the first end 218 of the first link 204 is rotatably coupled to the first end 210 of the post 202, the second end 220 of the first link 204 is rotatably coupled to the first end 250 of the third link 208, the first end 242 of the second link 206 is rotatably coupled to the second end 212 of the post 202, the second end 244 of the second link 206 is rotatably coupled to the second end 252 of the third link 208. The first end 262 of the lock 260 is coupled to the second end 212 of the post 202. The first end 268 of the spring 266 is coupled to the second end 212 of the post 202, and the second end 270 of the spring 266 is coupled to the third shaft 258 of the third link 208. The first end 210 of the post 202 is coupled to the rear bumper 108 and/or, more generally, to the rear end structure 106 of a vehicle (e.g., the vehicle 100 of FIG. 1).

In the illustrated example of FIGS. 3 and 4, the raised position of the height-adjustable spare tire carrier 102 is a position for storing a spare tire (e.g., the spare tire 114 of FIG. 1). For example, the height-adjustable spare tire carrier 102 may be positioned in the raised position shown in FIGS. 3 and 4 to store a spare tire while a vehicle (e.g., the vehicle 100 of FIG. 1) to which the height-adjustable spare tire carrier 102 is mounted is in motion. The third link 208 and/or, more generally, the Chebyshev linkage 104 of the height-adjustable spare tire carrier 102 is biased into the raised position of FIGS. 3 and 4 via the spring 266. When the height-adjustable spare tire carrier 102 is positioned in the raised position shown in FIGS. 3 and 4, the second link 206 is approximately perpendicular to the post 202. The second end 264 of the lock 260 engages the second link 206 and blocks and/or limits the second link from rotating past perpendicular (e.g., further upwards in the orientation of FIGS. 3 and 4) in relation to the post 202.

When the height-adjustable spare tire carrier 102 is positioned in the raised position shown in FIGS. 3 and 4, the third shaft 258 (e.g., the output shaft) of the third link 208 is positioned at a first height (H1) along the vertical axis 116 relative to the underlying ground surface 112. In the illustrated example of FIGS. 3 and 4, the first height (H1) is approximately 40.0 inches.

In the illustrated example of FIG. 5, the intermediate position of the height-adjustable spare tire carrier 102 is a position encountered in the process of lowering the height-adjustable spare tire carrier 102 from the raised position of FIGS. 3 and 4 to the lowered position of FIG. 6 described below. The third link 208 and/or, more generally, the Chebyshev linkage 104 of the height-adjustable spare tire carrier 102 is biased from the intermediate position of FIG. 5 into the raised position of FIGS. 3 and 4 via the spring 266. When the height-adjustable spare tire carrier 102 is positioned in the intermediate position shown in FIG. 5, the third shaft 258 (e.g., the output shaft) of the third link 208 is positioned at a second height (H2) along the vertical axis 116 relative to the underlying ground surface 112. The second height (H2) is less than the first height (H1) of FIGS. 3 and 4. In the illustrated example of FIG. 5, the second height (H2) is approximately 30.0 inches.

The height-adjustable spare tire carrier 102 may be moved into the intermediate position of FIG. 5 from the raised position of FIGS. 3 and 4 by applying a force (e.g., a downward force in the direction of the underlying ground surface 112) to a spare tire (e.g., the spare tire 114 of FIG. 1) carried by and/or coupled to the third shaft 258 (e.g., the output shaft) of the third link 208 of the height-adjustable spare tire carrier 102. Mechanically lowering the height-adjustable spare tire carrier 102 from the raised position of FIGS. 3 and 4 to the intermediate position of FIG. 5 reduces the amount of work that may be required by a person in connection with removing the spare tire from the height-adjustable spare tire carrier 102 and lowering the removed spare tire to the underlying ground surface 112.

In the illustrated example of FIG. 6, the lowered position of the height-adjustable spare tire carrier 102 is a position for removing a spare tire (e.g., the spare tire 114 of FIG. 1). For example, the height-adjustable spare tire carrier 102 may be positioned in the lowered position shown in FIG. 6 to remove a spare tire while a vehicle (e.g., the vehicle 100 of FIG. 1) to which the height-adjustable spare tire carrier 102 is mounted is stationary. The third link 208 and/or, more generally, the Chebyshev linkage 104 of the height-adjustable spare tire carrier 102 is biased from the lowered position of FIG. 6 into the raised position of FIGS. 3 and 4 via the spring 266. When the height-adjustable spare tire carrier 102 is positioned in the lowered position shown in FIG. 6, the first link 204 (e.g., the linear section 226 of the first link 204) is approximately perpendicular to the post 202. The third shaft 258 (e.g., the output shaft) of the third link 208 engages the detent 240 of the first link 204, which accordingly prevents the first link 204 from rotating past perpendicular (e.g., further downwards in the orientation of FIG. 6) in relation to the post 202.

When the height-adjustable spare tire carrier 102 is positioned in the lowered position shown in FIG. 6, the third shaft 258 (e.g., the output shaft) of the third link 208 is positioned at a third height (H3) along the vertical axis 116 relative to the underlying ground surface 112. The third height (H3) is less than the first height (H1) of FIGS. 3 and 4 and less than the second height (H2) of FIG. 5. In the illustrated example of FIG. 6, the third height (H3) is approximately 20.0 inches.

The height-adjustable spare tire carrier 102 may be moved into the lowered position of FIG. 6 from the raised position of FIGS. 3 and 4 (or the intermediate position of FIG. 5) by applying a force (e.g., a downward force in the direction of the underlying ground surface 112) to a spare tire (e.g., the spare tire 114 of FIG. 1) carried by and/or coupled to the third shaft 258 (e.g., the output shaft) of the third link 208 of the height-adjustable spare tire carrier 102. Mechanically lowering the height-adjustable spare tire carrier 102 from the raised position of FIGS. 3 and 4 to the lowered position of FIG. 6 reduces the amount of work that may be required by a person in connection with removing the spare tire from the height-adjustable spare tire carrier 102 and lowering the removed spare tire to the underlying ground surface 112.

Figure 7:
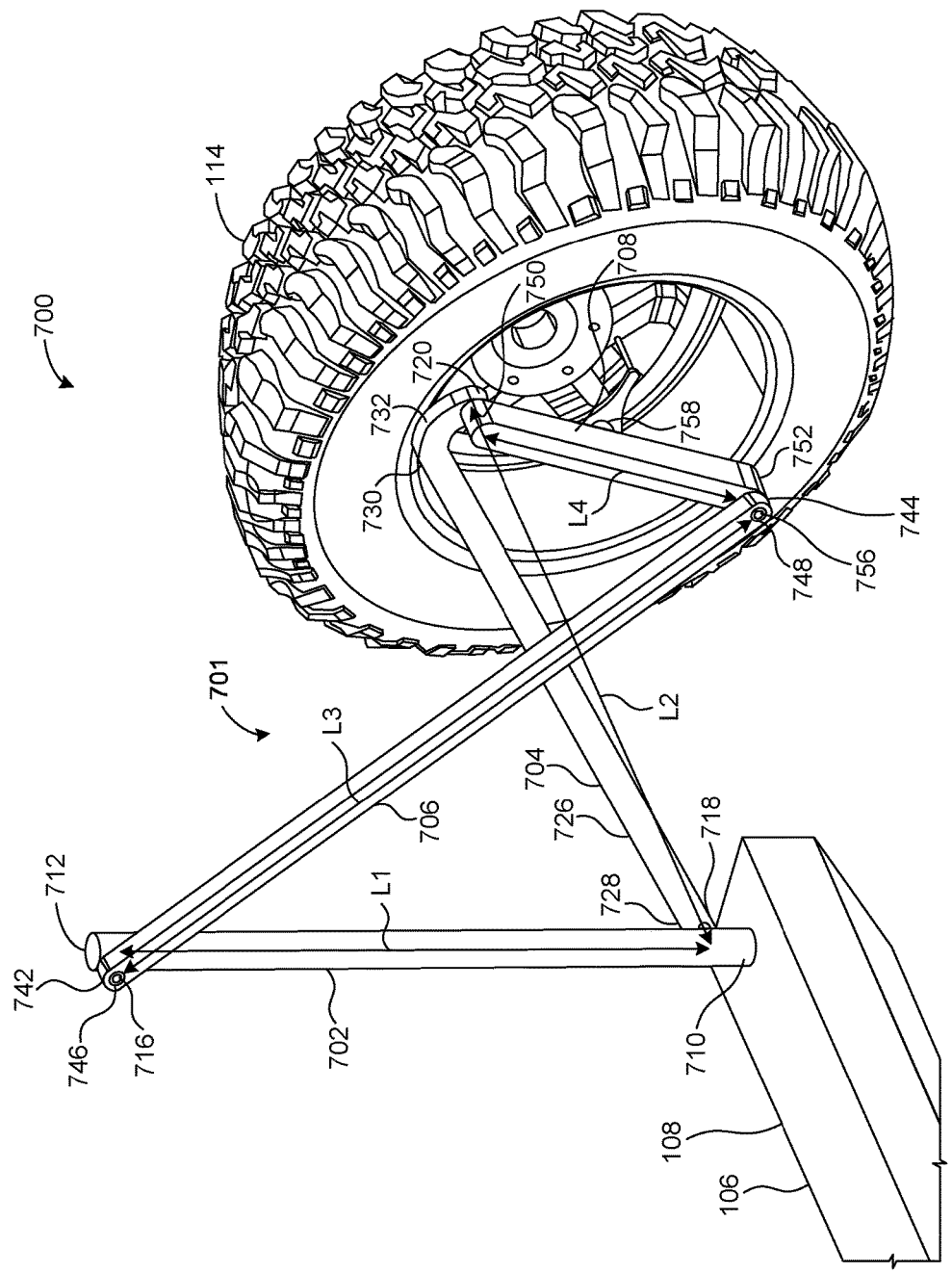
FIG. 7 is a perspective view of a second example height-adjustable spare tire carrier having a second example Chebyshev linkage constructed in accordance with the teachings of this disclosure.

FIG. 7 is a perspective view of a second example height-adjustable spare tire carrier 700 having a second example Chebyshev linkage 701 constructed in accordance with the teachings of this disclosure. The height-adjustable spare tire carrier 700 of FIG. 7 may be mounted to the example rear end structure 106 (e.g., the example rear bumper 108) of the example vehicle 100 of FIG. 1, and may carry the example spare tire 114 of FIG. 1. The Chebyshev linkage 701 of FIG. 7 includes an example post 702, an example first link 704, an example second link 706, and an example third link 708. Any of the post 702, the first link 704, the second link 706, and/or the third link 708 may be implemented as one or more link(s), strut(s), bar(s), rod(s), shaft(s), plate(s), etc. of any shape(s) and/or any size(s), including the shape(s) and/or size(s) described below.

The post 702 of FIG. 7 includes an example first end 710 and an example second end 712 located opposite the first end 710 of the post 702. The post 702 of FIG. 7 further includes an example first shaft 714 (not visible in FIG. 7) located proximate the first end 710 of the post 702, and an example second shaft 716 located proximate the second end 712 of the post 702. In the illustrated example of FIG. 7, the first shaft 714 of the post 702 extends transversely from the post 702 in a first direction, and the second shaft 716 of the post 702 extends transversely from the post 702 in a second direction opposite the first direction.

The post 702 of FIG. 7 has a linear, cylindrical shape that defines an associated length (L1) of the post 702. The associated length (L1) of the post 702 may be measured as the distance between the center of the first shaft 714 of the post 702 and the center of the second shaft 716 of the post 702. In some examples, the associated length (L1) of the post 702 of FIG. 7 may have a value ranging between approximately 18.0 and 24.0 inches. In the illustrated example of FIG. 7, the associated length (L1) of the post 702 of FIG. 7 may be approximately 20.0 inches.

The first link 704 of FIG. 7 includes an example first end 718 and an example second end 720 located opposite the first end 718 of the first link 704. The first link 704 of FIG. 7 further includes an example first through hole 722 (not visible in FIG. 7) formed proximate the first end 718 of the first link 704, and an example second through hole 724 (not visible in FIG. 7) formed proximate the second end 720 of the first link 704.

The first link 704 of FIG. 7 has a bent shape that includes an example linear section 726 having an example first end 728 and an example second end 730 located opposite the first end 728 of the linear section 726, and an example curved section 732 formed at the second end 730 of the linear section 726. The first link 704 may be of any shape and/or size that enables the first link 704 and the third link 708 to rotate relative to one another without the first link 704 interfering with an output shaft of the third link 708 as the height-adjustable spare tire carrier 700 moves from a raised position to a lowered position.

The first link 704 of FIG. 7 has an associated length (L2) defined by the span and/or distance between the first end 718 of the first link 704 and the second end 720 of the first link 704. The associated length (L2) of the first link 704 may be measured as the distance between the center of the first through hole 722 of the first link 704 and the center of the second through hole 724 of the first link 704. In some examples, the associated length (L2) of the first link 704 of FIG. 7 is approximately five-fourths (e.g., one and one-fourth) the associated length (L1) of the post 702 of FIG. 7. In some examples, the associated length (L2) of the first link 704 of FIG. 7 may have a value ranging between approximately 22.5 and 30.0 inches. In the illustrated example of FIG. 7, the associated length (L2) of the first link 704 of FIG. 7 may be approximately 25.0 inches.

The second link 706 of FIG. 7 includes an example first end 742 and an example second end 744 located opposite the first end 742 of the second link 706. The second link 706 of FIG. 7 further includes an example first through hole 746 formed proximate the first end 742 of the second link 706, and an example second through hole 748 formed proximate the second end 744 of the second link 706.

The second link 706 of FIG. 7 has a linear shape that defines an associated length (L3) of the second link 706. The associated length (L3) of the second link 706 may be measured as the distance between the center of the first through hole 746 of the second link 706 and the center of the second through hole 748 of the second link 706. In some examples, the associated length (L3) of the second link 706 of FIG. 7 is approximately equal to the associated length (L2) of the first link 704 of FIG. 7. In some examples, the associated length (L3) of the second link 706 of FIG. 7 may have a value ranging between approximately 22.5 and 30.0 inches. In the illustrated example of FIG. 7, the associated length (L3) of the second link 706 of FIG. 7 may be approximately 25.0 inches.

The third link 708 of FIG. 7 includes an example first end 750 and an example second end 752 located opposite the first end 750 of the third link 708. The third link 708 of FIG. 7 further includes an example first shaft 754 (not visible in FIG. 7) located proximate the first end 750 of the third link 708, an example second shaft 756 located proximate the second end 752 of the third link 708, and an example third shaft 758 located approximately midway between the first end 750 of the third link 708 and the second end 752 of the third link 708. In the illustrated example of FIG. 7, the first shaft 754 of the third link 708 extends transversely from the third link 708 in a first direction, the second shaft 756 of the third link 708 extends transversely from the third link 708 in a second direction opposite the first direction, and the third shaft 758 of the third link 708 extends transversely from the third link 708 in the first direction.

The third link 708 of FIG. 7 has a linear shape that defines an associated length (L4) of the third link 708. The associated length (L4) of the third link 708 may be measured as the distance between the center of the first shaft 754 of the third link 708 and the center of the second shaft 756 of the third link 708. In some examples, the associated length (L4) of the third link 708 of FIG. 7 is approximately one-half the associated length (L1) of the post 702 of FIG. 7, and approximately two-fifths the associated length (L2) of the first link 704 of FIG. 7. In some examples, the associated length (L4) of the third link 708 of FIG. 7 may have a value ranging between approximately 9.0 and 12.0 inches. In the illustrated example of FIG. 7, the associated length (L4) of the third link 708 of FIG. 7 may be approximately 10.0 inches.

The third link 708 may be of any shape and/or size that enables the first link 704 and the third link 708 to rotate relative to one another without the first link 704 interfering with the third shaft 758 of the third link 708 as the height-adjustable spare tire carrier 700 moves from a raised position to a lowered position. For example, the third link 708 may be formed as a triangular-shaped plate-like structure wherein the first shaft 754, the second shaft 756, and the third shaft 758 of the third link 708 are respectively positioned proximate corresponding ones of the three vertices and/or corners of the triangle. In such an example, the vertical range of motion of the third shaft 758 of the third link 708 as the height-adjustable spare tire carrier 700 moves from a raised position to a lowered position may be increased relative to the range of motion that may be achieved via the example implementation of the third link 708 shown in FIG. 7.

In the illustrated example of FIG. 7, the third shaft 758 of the third link 708 functions and/or serves as an output shaft for the Chebyshev linkage 701 and/or the height-adjustable spare tire carrier 700 of FIG. 7. In some examples, the spare tire 114 of FIGS. 1 and 7 may be removably coupled and/or mounted (e.g., directly or indirectly) to the third shaft 758 of the third link 708 of the Chebyshev linkage 701. When the spare tire 114 is coupled and/or mounted to the third shaft 758 of the third link 708, the height and/or position of the spare tire 114 along the vertical axis 116 of FIG. 1 is based on the height and/or position of the third shaft 758 of the third link 708 of the Chebyshev linkage 701.

When the Chebyshev linkage 701 of the height-adjustable spare tire carrier 700 is assembled as shown in FIG. 7, the first end 718 of the first link 704 of FIG. 7 is rotatably coupled to the first end 710 of the post 702 of FIG. 7, the second end 720 of the first link 704 of FIG. 7 is rotatably coupled to the first end 750 of the third link 708 of FIG. 7, the first end 742 of the second link 706 of FIG. 7 is rotatably coupled to the second end 712 of the post 702 of FIG. 7, and the second end 744 of the second link 706 of FIG. 7 is rotatably coupled to the second end 752 of the third link 708 of FIG. 7.

For example, the first end 718 of the first link 704 of FIG. 7 may be rotatably coupled to the first end 710 of the post 702 of FIG. 7 by positioning the first shaft 714 of the post 702 of FIG. 7 within the first through hole 722 of the first link 704 of FIG. 7. The second end 720 of the first link 704 of FIG. 7 may be rotatably coupled to the first end 750 of the third link 708 of FIG. 7 by positioning the first shaft 754 of the third link 708 of FIG. 7 within the second through hole 724 of the first link 704 of FIG. 7. The first end 742 of the second link 706 of FIG. 7 may be rotatably coupled to the second end 712 of the post 702 of FIG. 7 by positioning the second shaft 716 of the post 702 of FIG. 7 within the first through hole 746 of the second link 706 of FIG. 7. The second end 744 of the second link 706 of FIG. 7 may be rotatably coupled to the second end 752 of the third link 708 of FIG. 7 by positioning the second shaft 756 of the third link 708 of FIG. 7 within the second through hole 748 of the second link 706 of FIG. 7.

In other examples, the above-described rotatable couplings between the post 702, the first link 704, the second link 706, and the third link 708 of the Chebyshev linkage 701 of the height-adjustable spare tire carrier 700 of FIG. 7 may alternatively be implemented by any type(s) of fastener(s) (e.g., screw(s), bolt(s), pin(s), rivet(s), etc.) that enable the first link 704 and/or the second link 706 of FIG. 7 to be rotatably coupled to the post 702 of FIG. 7, and/or that enable the third link 708 of FIG. 7 to be rotatably coupled to the first link 704 and/or the second link 706 of FIG. 7.

In the illustrated example of FIG. 7, the Chebyshev linkage 701 and/or the height-adjustable spare tire carrier 700 is shown coupled and/or mounted to the rear end structure 106 of the vehicle 100 of FIG. 1. More specifically, the first end 710 of the post 702 is coupled and/or mounted to the rear bumper 108 of the vehicle 100 of FIG. 1. In the illustrated example of FIG. 7, the post 702 is pivotable and/or rotatable relative to the rear bumper 108 of the vehicle 100 such that the height-adjustable spare tire carrier 700 may be pivoted and/or rotated away from the rear bumper 108 of the vehicle 100 to enable a tailgate of the vehicle 100 proximate the tail light section 110 to be opened without interference from the height-adjustable spare tire carrier 700.

In the illustrated example of FIG. 7, the height-adjustable spare tire carrier 700 is shown in an intermediate position located between a raised position and a lowered position. When the height-adjustable spare tire carrier 700 of FIG. 7 is positioned in the raised position, the second link 706 of FIG. 7 is approximately perpendicular to the post 702 of FIG. 7. The raised position of the height-adjustable spare tire carrier 700 is a position for storing a spare tire (e.g., the spare tire 114 of FIGS. 1 and 7). For example, the height-adjustable spare tire carrier 700 may be positioned in the raised position to store a spare tire while a vehicle (e.g., the vehicle 100 of FIG. 1) to which the height-adjustable spare tire carrier 700 is mounted is in motion. When the height-adjustable spare tire carrier 700 is positioned in the raised position, the third shaft 758 (e.g., the output shaft) of the third link 708 is positioned at a first height along the vertical axis 116 of FIG. 1 relative to the underlying ground surface 112 of FIG. 1.

The intermediate position of the height-adjustable spare tire carrier 700 shown in FIG. 7 is a position encountered in the process of lowering the height-adjustable spare tire carrier 700 from the raised position to the lowered position described below. When the height-adjustable spare tire carrier 700 is positioned in the intermediate position shown in FIG. 7, the third shaft 758 (e.g., the output shaft) of the third link 708 is positioned at a second height along the vertical axis 116 relative to the underlying ground surface 112 of FIG. 1. The second height is less than the first height associated with the raised position.

The height-adjustable spare tire carrier 700 may be moved into the intermediate position of FIG. 7 from the raised position by applying a force (e.g., a downward force in the direction of the underlying ground surface 112) to a spare tire (e.g., the spare tire 114 of FIGS. 1 and 7) carried by and/or coupled to the third shaft 758 (e.g., the output shaft) of the third link 708 of the height-adjustable spare tire carrier 700. Mechanically lowering the height-adjustable spare tire carrier 700 from the raised position to the intermediate position of FIG. 7 reduces the amount of work that may be required by a person in connection with removing the spare tire from the height-adjustable spare tire carrier 700 and lowering the removed spare tire to the underlying ground surface 112.

When the height-adjustable spare tire carrier 700 of FIG. 7 is positioned in the lowered position, the linear section 226 of the first link 704 of FIG. 7 is approximately perpendicular to the post 702 of FIG. 7. The lowered position of the height-adjustable spare tire carrier 700 is a position for removing a spare tire (e.g., the spare tire 114 of FIGS. 1 and 7). For example, the height-adjustable spare tire carrier 700 may be positioned in the lowered position to remove a spare tire while a vehicle (e.g., the vehicle 100 of FIG. 1) to which the height-adjustable spare tire carrier 700 is mounted is stationary. When the height-adjustable spare tire carrier 700 is positioned in the lowered position, the third shaft 758 (e.g., the output shaft) of the third link 708 is positioned at a third height along the vertical axis 116 relative to the underlying ground surface 112 of FIG. 1. The third height is less than the first height associated with the raised position, and less than the second height associated with the intermediate position.

The height-adjustable spare tire carrier 700 may be moved into the lowered position from the raised position (or the intermediate position of FIG. 7) by applying a force (e.g., a downward force in the direction of the underlying ground surface 112) to a spare tire (e.g., the spare tire 114 of FIGS. 1 and 7) carried by and/or coupled to the third shaft 758 (e.g., the output shaft) of the third link 708 of the height-adjustable spare tire carrier 700. Mechanically lowering the height-adjustable spare tire carrier 700 from the raised position to the lowered position reduces the amount of work that may be required by a person in connection with removing the spare tire from the height-adjustable spare tire carrier 700 and lowering the removed spare tire to the underlying ground surface 112.

From the foregoing, it will be appreciated that the disclosed height-adjustable spare tire carriers include a Chebyshev linkage that advantageously enables a spare tire (e.g., a full-size spare tire) carried by an output shaft of the Chebyshev linkage to be mechanically lowered from a first position (e.g., a raised position) separated from an underlying ground surface by a first distance to a second position (e.g., a lowered position) separated from the underlying ground surface by a second distance that is less than the first distance. Mechanically lowering the spare tire from the first position to the second position via the Chebyshev linkage advantageously reduces the amount of work to be performed by a person in connection with removing and/or attaching the spare tire from and/or to the spare tire carrier, including lowering the spare tire from the spare tire carrier to an underlying ground surface, and/or raising the spare tire from the underlying ground surface to the spare tire carrier.

In some examples, an apparatus is disclosed. In some disclosed examples, the apparatus comprises a spare tire carrier to be coupled to a vehicle. In some disclosed examples, the spare tire carrier includes a Chebyshev linkage having an output shaft to carry a spare tire of the vehicle. In some disclosed examples, the output shaft is movable between a raised position and a lowered position.

In some disclosed examples, the output shaft is to move between the raised position and the lowered position along a vertical axis. In some disclosed examples, the spare tire is removably coupled to the output shaft. In some disclosed examples, the raised position has a first height. In some disclosed examples, the lowered position has a second height less than the first height. In some disclosed examples, the second height is approximately one-half of the first height.

In some disclosed examples, the Chebyshev linkage further includes a post having a first end and a second end located opposite the first end of the post. In some disclosed examples, the post is to be coupled to the vehicle. In some disclosed examples, the Chebyshev linkage further includes a first link having a first end and a second end located opposite the first end of the first link. In some disclosed examples, the Chebyshev linkage further includes a second link having a first end and a second end located opposite the first end of the second link. In some disclosed examples, the Chebyshev linkage further includes a third link having a first end and a second end located opposite the first end of the third link. In some disclosed examples, the third link includes the output shaft.

In some disclosed examples, the first end of the first link is rotatably coupled to the first end of the post. In some disclosed examples, the second end of the first link is rotatably coupled to the first end of the third link. In some disclosed examples, the first end of the second link is rotatably coupled to the second end of the post. In some disclosed examples, the second end of the second link is rotatably coupled to the second end of the third link.

In some disclosed examples, the post includes a first shaft proximate the first end of the post and a second shaft proximate the second end of the post. In some disclosed examples, the first link includes a first through hole formed proximate the first end of the first link and a second through hole formed proximate the second end of the first link. In some disclosed examples, the second link includes a first through hole formed proximate the first end of the second link and a second through hole formed proximate the second end of the second link. In some disclosed examples, the third link includes a first shaft proximate the first end of the third link, a second shaft proximate the second end of the third link, and the output shaft positioned midway between the first end of the third link and the second end of the third link.

In some disclosed examples, the first shaft of the post is positioned within the first through hole of the first link. In some disclosed examples, the first shaft of the third link is positioned within the second through hole of the first link. In some disclosed examples, the second shaft of the post is positioned within the first through hole of the second link. In some disclosed examples, the second shaft of the third link is positioned within the second through hole of the second link.

In some disclosed examples, the first link has a bent shape. In some disclosed examples, the first link includes a linear section having a first end and a second end located opposite the first end of the linear section. In some disclosed examples, the first link includes a first angled section extending at a first angle from the first end of the linear section. In some disclosed examples, the first link includes a second angled section extending at a second angle from the second end of the linear section. In some disclosed examples, the first link includes a detent formed proximate a juncture of the linear section and the second angled section of the first link. In some disclosed examples, the output shaft is to be received in the detent when the output shaft is in the lowered position.

In some disclosed examples, the spare tire carrier further includes a spring having a first end and a second end located opposite the first end of the spring. In some disclosed examples, the first end of the spring is coupled to the second end of the post. In some disclosed examples, the second end of the spring is coupled to the output shaft. In some disclosed examples, the spring is to bias the output shaft away from the lowered position and toward the raised position.

In some disclosed examples, the second link is approximately perpendicular to the post when the output shaft is in the raised position. In some disclosed examples, the spare tire carrier further includes a lock to engage the second link to prevent the second link from rotating beyond perpendicular when moving the output shaft from the lowered position to the raised position.

In some disclosed examples, an apparatus comprises a spare tire carrier to be coupled to a vehicle. In some disclosed examples, the spare tire carrier includes a Chebyshev linkage having a shaft to carry a spare tire of the vehicle. In some disclosed examples, the shaft is movable along a vertical axis between a raised position having a first height and a lowered position having a second height less than the first height.

In some disclosed examples, the Chebyshev linkage further includes a post having a first end and a second end located opposite the first end of the post. In some disclosed examples, the post is to be coupled to the vehicle. In some disclosed examples, the Chebyshev linkage further includes a first link having a first end and a second end located opposite the first end of the first link. In some disclosed examples, the Chebyshev linkage further includes a second link having a first end and a second end located opposite the first end of the second link. In some disclosed examples, the Chebyshev linkage further includes a third link having a first end and a second end located opposite the first end of the third link. In some disclosed examples, the third link includes the shaft.

In some disclosed examples, the first end of the first link is rotatably coupled to the first end of the post. In some disclosed examples, the second end of the first link is rotatably coupled to the first end of the third link. In some disclosed examples, the first end of the second link is rotatably coupled to the second end of the post. In some disclosed examples, the second end of the second link is rotatably coupled to the second end of the third link. In some disclosed examples, the post, the second link, and the third link have respective linear shapes, and the first link has a bent shape.

Although certain example apparatus and articles of manufacture have been disclosed herein, the scope of coverage of this patent is not limited thereto. On the contrary, this patent covers all apparatus and articles of manufacture fairly falling within the scope of the claims of this patent.

What is claimed is:

1. An apparatus, comprising:
a spare tire carrier to be coupled to a vehicle, the spare tire carrier including a Chebyshev linkage, the Chebyshev linkage including:
a post having a first end and a second end located opposite the first end of the post, the post to be coupled to the vehicle;
a first link having a first end and a second end located opposite the first end of the first link;
a second link having a first end and a second end located opposite the first end of the second link; and
a third link having a first end and a second end located opposite the first end of the third link, the third link including an output shaft to carry a spare tire of the vehicle, the output shaft being movable between a raised position and a lowered position relative to an underlying ground surface on which the vehicle is positioned;
wherein the first end of the first link is rotatably coupled to the first end of the post, the second end of the first link is rotatably coupled to the first end of the third link, the first end of the second link is rotatably coupled to the second end of the post, and the second end of the second link is rotatably coupled to the second end of the third link.

2. The apparatus of claim 1, wherein the output shaft is to move between the raised position and the lowered position along a vertical axis.

3. The apparatus of claim 1, wherein the spare tire is removably coupled to the output shaft.

4. The apparatus of claim 1, wherein the raised position has a first height relative to the underlying ground surface and the lowered position has a second height relative to the underlying ground surface, the second height being less than the first height.

5. The apparatus of claim 4, wherein the second height is approximately one-half of the first height.

6. The apparatus of claim 1, wherein:
the post includes a first shaft proximate the first end of the post and a second shaft proximate the second end of the post;
the first link includes a first through hole formed proximate the first end of the first link and a second through hole formed proximate the second end of the first link;
the second link includes a first through hole formed proximate the first end of the second link and a second through hole formed proximate the second end of the second link; and
the third link includes a first shaft proximate the first end of the third link, a second shaft proximate the second end of the third link, and the output shaft positioned midway between the first end of the third link and the second end of the third link.

7. The apparatus of claim 6, wherein the first shaft of the post is positioned within the first through hole of the first link, the first shaft of the third link is positioned within the second through hole of the first link, the second shaft of the post is positioned within the first through hole of the second link, and the second shaft of the third link is positioned within the second through hole of the second link.

8. The apparatus of claim 1, wherein the first link has a bent shape.

9. The apparatus of claim 8, wherein the first link includes a linear section having a first end and a second end located opposite the first end of the linear section, a first angled section extending at a first angle from the first end of the linear section, and a second angled section extending at a second angle from the second end of the linear section.

10. The apparatus of claim 9, wherein the first link includes a detent formed proximate a juncture of the linear section and the second angled section of the first link, the output shaft to be received in the detent when the output shaft is in the lowered position.

11. The apparatus of claim 1, wherein the spare tire carrier further includes a spring having a first end and a second end located opposite the first end of the spring, the first end of the spring being coupled to the second end of the post, the second end of the spring being coupled to the output shaft, the spring to bias the output shaft away from the lowered position and toward the raised position.

12. The apparatus of claim 1, wherein the second link is approximately perpendicular to the post when the output shaft is in the raised position.

13. The apparatus of claim 12, wherein the spare tire carrier further includes a lock to engage the second link to prevent the second link from rotating beyond perpendicular when moving the output shaft from the lowered position to the raised position.

14. An apparatus, comprising:
a spare tire carrier to be coupled to a vehicle, the spare tire carrier including a Chebyshev linkage, the Chebyshev linkage including:
a post having a first end and a second end located opposite the first end of the post, the post to be coupled to the vehicle;
a first link having a first end and a second end located opposite the first end of the first link;
a second link having a first end and a second end located opposite the first end of the second link; and
a third link having a first end and a second end located opposite the first end of the third link, the third link including a shaft to carry a spare tire of the vehicle, the shaft being movable along a vertical axis between a raised position having a first height relative to an underlying ground surface on which the vehicle is positioned, and a lowered position having a second height relative to the underlying ground surface, the second height being less than the first height;

wherein the first end of the first link is rotatably coupled to the first end of the post, the second end of the first link is rotatably coupled to the first end of the third link, the first end of the second link is rotatably coupled to the second end of the post, and the second end of the second link is rotatably coupled to the second end of the third link.

15. The apparatus of claim 14, wherein the second height is approximately one-half of the first height.

16. The apparatus of claim 14, wherein the post, the second link, and the third link have respective linear shapes, and the first link has a bent shape.

17. An apparatus comprising:

a spare tire carrier to be coupled to a vehicle, the spare tire carrier including a Chebyshev linkage having an output shaft to carry a spare tire of the vehicle, the output shaft being movable in an approximately straight line along a vertical axis between a raised position and a lowered position relative to an underlying ground surface on which the vehicle is positioned, the Chebyshev linkage including:
- a post to be coupled to the vehicle;
- a first link rotatably coupled to the post;
- a second link rotatably coupled to the post; and
- a third link rotatably coupled to the first link and further rotatably coupled to the second link, the third link including the output shaft.

18. The apparatus of claim 17, wherein the spare tire carrier further includes a spring having a first end coupled to the post and a second end coupled to the output shaft, the spring to bias the output shaft away from the lowered position and toward the raised position.

19. The apparatus of claim 17, wherein the post has a first length, the first link has a second length, the second link has a third length, and the third link has a fourth length, the ratio between the first, second, third and fourth lengths being approximately 4:5:5:2.

* * * * *